United States Patent Office 3,167,632
Patented Jan. 26, 1965

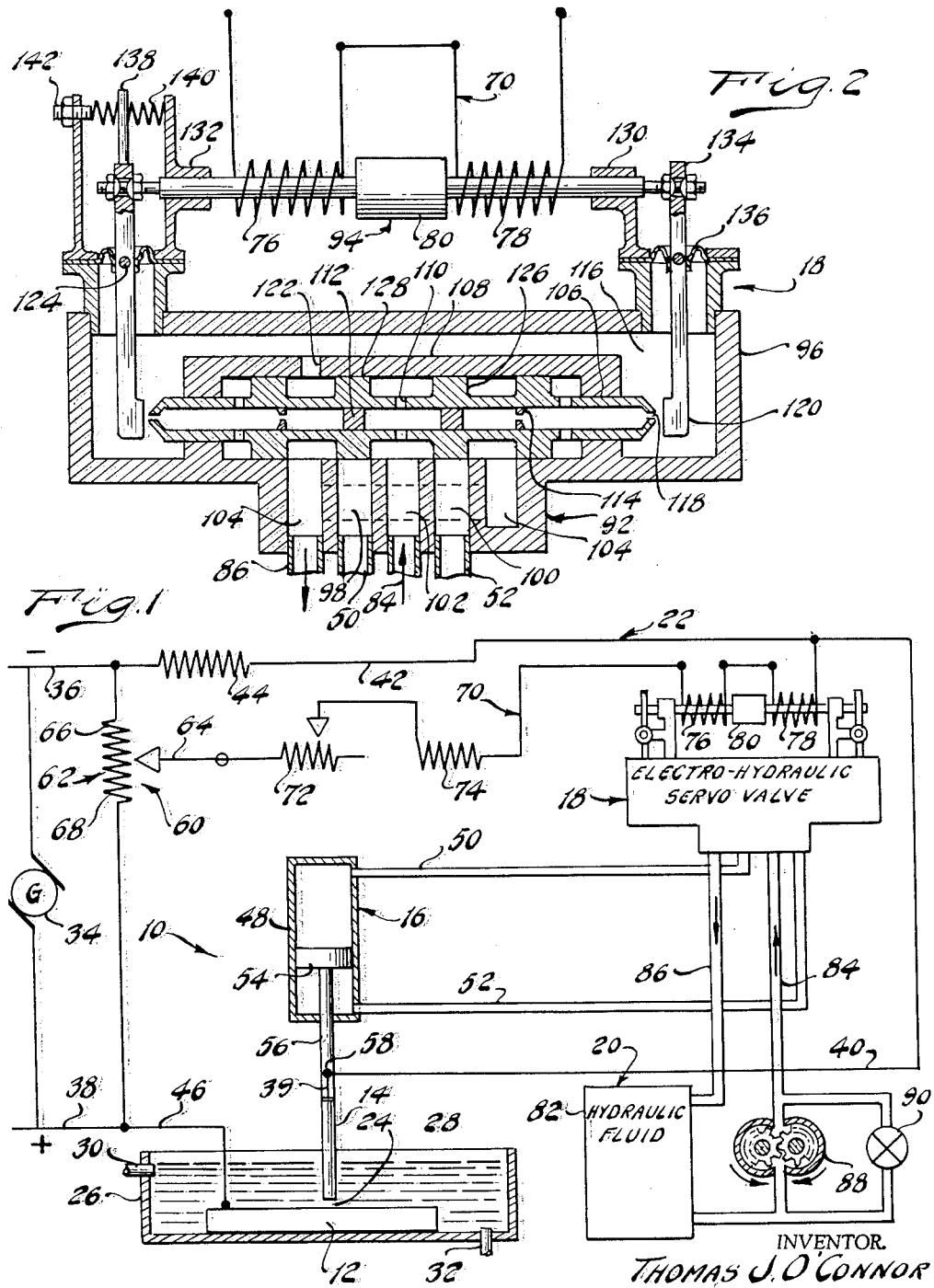

3,167,632
ELECTRO-HYDRAULIC ELECTRODE FEED FOR SPARK CUTTING APPARATUS
Thomas J. O'Connor, Ann Arbor, Mich., assignor to Easco Products, Inc., Ann Arbor, Mich., a corporation of Michigan
Filed Dec. 18, 1961, Ser. No. 159,955
1 Claim. (Cl. 219—69)

The invention relates to spark erosion of a workpiece and refers more specifically to improved electro-hydraulic electrode feed apparatus for an electrical discharge machine which is operable to more uniformly maintain a predetermined spark gap between the electrode of the electrical discharge machine and a workpiece being eroded thereby.

In the past it has been found in spark erosion machining that it is desirable from the standpoint of surface finish, speed and accuracy to manitain the electrode of an electrical discharge machine and the workpiece in an exact predetermined spaced relation. The maintaining of a predetermined spacing between the electrode of an electrical discharge machine and a workpiece being eroded thereby requires mechanism for exact sensing of the spark gap therebetween at all times and means responsive to said mechanism for accurately positioning the electrode in accordance with the spark gap sensed.

Apparatus for maintaining a predetermined spark gap in electrical discharge machines for spark erosion machining have in the past been deficient in their ability to maintain a predetermined spark gap with desired accuracy and speed without the use of mechanisms such as electronic amplifying systems the cost of which is prohibitive. Wherein such mechanism have not been so complicated as to be prohibitive they have lacked accuracy and speed of operation due to the inherent limitations of mechanical apparatus such as gear box transmissions operated by servo motors and rack and pinion electrode positioning means.

It is therefore one of the objects of the present invention to provide improved apparatus for automatically maintaining a predetermined spark gap between the electrode of an electrical discharge machine for spark erosion of a workpiece and a workpiece being eroded thereby.

Another object is to provide apparatus for automatically maintaining a predetermined spark gap between the electrode of an electrical discharge machine for spark erosion of a workpiece and a workpiece being eroded thereby comprising hydraulic cylinder and piston structure supporting the electrode of the electrical discharge machine, a source of hydraulic fluid under pressure for actuating the hydraulic cylinder and piston structure to move the electrode toward or away from the workpiece, electrical means for sensing the magnitude of the spark gap and an electro-hydraulic servo valve responsive to the electrical means for connecting the source of hydraulic fluid to the cylinder and piston structure to move the electrode supported thereby in a direction to maintain the predetermined spark gap between the electrode and workpiece.

Another object is to provide apparatus for automatically maintaining a predetermined spark gap between the electrode of an electrical discharge machine for spark erosion of a workpiece and a workpiece being eroded thereby as set forth above wherein the electro-hydraulic servo valve includes an electric coil and an armature operably associated with the electric coil for movement thereby in accordance with the direction and magnitude of current passing through the coil producing a variable flux density therearound to directly connect the source of hydraulic fluid to the cylinder and piston structure.

Another object is to provide apparatus for automatically maintaining a predetermined spark gap between the electrode of an electrical discharge machine for spark erosion of a workpiece and a workpiece being eroded thereby as set forth above wherein the electric means includes a bridge circuit, one branch of which includes the spark gap and wherein the electric coil of the electro-hydraulic servo valve is connected between the branches of the bridge circuit so that no current flows therein when the bridge is balanced and current flows therethrough in opposite directions depending on the direction of unbalance of the bridge.

Another object is to provide apparatus for maintaining a predetermined spark gap in electrical discharge machines as set forth above wherein the bridge circuit includes means for varying the impedance values of selected branches of the bridge to establish the predetermined spark gap.

Another object is to provide apparatus for maintaining a predetermined spark gap in electrical discharge machines as set forth above wherein the bridge circuit further includes means for varying the magnitude of current flowing through the coil of the electro-hydraulic servo valve due to a predetermined bridge unbalance to prevent coil damage.

Another object is to provide apparatus for maintaining a predetermined spark gap in electrical discharge machines as set forth above which is simple in construction, economical to manufacture and efficient in use.

Other objects and features of the invention will become apparent as the description proceeds, especially when taken in conjunction with the accompanying drawings, illustrating a preferred embodiment of the invention, wherein:

FIGURE 1 is a partially schematic and partially diagrammatic representation of apparatus for maintaining a predetermined spark gap between the electrode of an electrical discharge machine for spark erosion of a workpiece and the workpiece which is constructed in accordance with the invention.

FIGURE 2 is an enlarged diagrammatic section view of the electro-hydraulic servo valve used in the spark gap maintaining apparatus illustrated in FIGURE 1.

With particular reference to the figures of the drawing one embodiment of the present invention will now be considered.

As shown best in FIGURE 1 the apparatus 10 for maintaining a predetermined spark gap between a workpiece 12 and an electrode 14 of an electrical discharge machine for spark erosion of the workpiece 12 includes the hydraulic piston and cylinder structure 16 supporting the electrode 14 for movement toward or away from the workpiece 12. The apparatus 10 further includes the source of hydraulic fluid 20 for supplying hydraulic fluid at a substantially constant pressure, the electric circuit 22 shown as included in the main power circuit of the electrical discharge machine operable to develop an electric signal having a magnitude and polarity representative of the deviation of the spark gap from the predetermined spark gap and the electro-hydraulic servo valve 18 responsive to the developed electric signal to directly connect the source of hydraulic fluid 20 to the piston and cylinder structure 16 to cause movement of the electrode in a direction to maintain the predetermined spark gap. The electric circuit 22 is such that when the spark gap 24 is of the predetermined magnitude no electric signal is developed to actuate the electro-hydraulic servo valve and the valve is balanced so that no unbalanced hydraulic pressure is applied to the piston and cylinder structure 16 from the source of hydraulic fluid 20.

More specifically the apparatus 10 for maintaining a predetermined spark gap is as previously indicated provided in conjunction with an electrical discharge machine for spark erosion machining of a workpiece 12. The portion of the electrical discharge machine illustrated in FIGURE 1 includes the reservoir 26 for an insulating liquid such as oil 28 which may be circulated therethrough by means of the input conduit 30 and the outlet conduit 32.

The electrical discharge machine with which the apparatus 10 of the invention is used further includes the source of electrical power 34 which for example may be of either the known rotary impulse, resistor condenser, transistor or pulse type for rough or finish work operable to provide a potential difference between the input conductors 36 and 38 of 220 volts for example with the polarity shown in FIGURE 1. Thus the electrode 14 of the electrical discharge machine is connected through the conductors 39, 40 and 42, the resistance 44 and the input conductor 36 to the negative side of the power supply 34 while the workpiece 12 is connected through the conductor 46 and the input conductor 38 to the positive side of the power supply 34. This is in accordance with the usual electrical connections of electrical discharge machines since a positive electrode will erode faster than a negative electrode due to spark discharge occurring therebetween.

The piston and cylinder structure 16 for moving the electrode 14 toward and away from the workpiece 12 includes the hydraulic cylinder 48, the opposite ends of which are connected directly to the electro-hydraulic servo valve 18 by means of the hydraulic conduits 50 and 52. The piston 54 is positioned within the cylinder 48 for reciprocal movement therein and is connected to the piston rod 56 to produce reciprocal movement of the piston rod 56 and the electrode 14 rigidly connected thereto on movement of the piston 54 within the cylinder 48. An electrical connection 58 between the conductor 40 and the conductor 39 which is secured to the electrode 14 is provided on the piston rod 56.

In operation the hydraulic cylinder and piston structure 16 will operate to move the electrode 14 toward the workpiece 12 on a source of hydraulic fluid under pressure being connected ot the conductor 50 with the conductor 52 being connected to a hydraulic fluid exhaust conduit. Conversely with the conduit 52 connected to a source of hydraulic fluid under pressure and the conduit 50 connected to a hydraulic fluid exhaust conduit the electrode 14 will be caused to move away from the workpiece 12 to increase the spark gap 24.

The electric circuit 22, as best shown in FIGURE 1, is a bridge circuit connected across the input conductors 36 and 38 of the electric power supply 34. The potentiometer 60 including the resistance 62 and variable position arm 64 provides two branches or arms of the bridge circuit comprising the resistance portions 66 and 68, the resistance ratio of which resistance portions may be varied. The other two branches of the bridge circuit which are in series and are in parallel with the resistance 62 of potentiometer 60 comprise the resistance 44 and the spark gap 24 between the electrode 14 and workpiece 12. The bridge circuit is completed by the balance sensing circuit 70 connected between the variable position arm 64 of the potentiometer 60 and the junction of the conductors 42 and 40.

The balance sensing circuit 70 includes the variable resistance 72, the fixed resistance 74 and the coils 76 and 78 of the electro-hydraulic servo valve 18. The coils 76 and 78 as shown are so wound as to produce movement of the magnetic armature 80 of the electro-hydraulic servo valve 18 in opposite directions on current flow therethrough in opposite directions in accordance with the magnitude of the current as indicated by the flux density surrounding the coils.

The resistance 74 is provided to limit the current through the circuit 70 due to bridge unbalance to prevent currents of a magnitude harmful to the coils 76 and 78 from passing through the balance sensing circuit. Variable resistor 72 is provided to control the magnitude of movement of the armature 80 due to a particular unbalanced condition of the bridge circuit by further limiting the current passing through the balance sensing circuit 70.

In operation the variable position arm 64 of the potentiometer 60 is set to provide a balanced bridge when a predetermined spark gap 24 is present between the electrode 14 and the workpiece 12. The variable resistor 72 is then set to limit the current through the balance sensing circuit 70 due to any bridge unbalance to a value below that which might damage the electro-hydraulic servo valve coils 76 and 78.

The source 20 of hydraulic fluid at a substantially constant pressure includes the hydraulic fluid reservoir 82, the fluid supply conduit 84 leading therefrom and the exhaust conduit 86 for carrying hydraulic fluid back to the hydraulic fluid reservoir. The pump 88 is provided in the hydraulic fluid supply conduit 84 and is operable to supply fluid from the hydraulic fluid reservoir 82 to the electro-hydraulic servo valve at a substantially constant pressure in conjunction with the pressure sensitive bypass valve 90. Thus in operation the pump 88 pumps fluid in excess of that required by the electro-hydraulic servo valve, the excess fluid is returned through the pressure sensitive bypass valve 90 to the hydraulic fluid reservoir so that the hydraulic fluid pressure in the fluid supply conduit 84 is always substantially constant.

The electro-hydraulic servo valve 18 as best shown in FIGURE 2, includes the hydraulic portion 92 in conjunction with an electrical portion 94. The hydraulic portion 92 of the electro-hydraulic servo valve 18 includes the sealed housing 96 to which the conduits 50 and 52 from the hydraulic cylinder 48 are connected as previously indicated. The hydraulic fluid supply conduit 84 and exhaust conduit 86 are similarly connected to the housing 96 as shown in FIGURE 2. The conduits 50, 52, 84 and 86 are connected to the passages 98, 100, 102 and 104 in the housing 96, respectively. Communication between the passages 98, 100, 102 and 104 is controlled by the flanged four-way valve 106 which is movable axially in the cylinder 108 contained in the housing 96.

The flow of hydraulic fluid through the hydraulic portion 92 of the electro-hydraulic servo valve 18 with the valve in a balanced condition is through the conduit 84 from the pump 88 into the chamber 102, through the radial openings 110 in the valve 106 and axially through the hollow interior of the valve 106 in both directions through the filters 112 and fixed orifices 114 into chamber 116 through the variable orifices 118 which are controlled by the flapper valves 120 provided at each end of the valve 106. The hydraulic fluid is then returned to the exhaust conduit 86 through the opening 122 in the cylinder 108 within the housing 96 and the passage 104.

If an unbalanced condition exists in the bridge circuit 22 the flapper valves 120 which are connected for movement together about their pivotal mountings 124 by the armature 80 in a manner to be considered subsequently will be moved to oppositely vary the orifices 118 whereby the valve 106 will be caused to move either to the right or left depending on the direction of movement of the armature 80. From a consideration of the arrangement of passages 98, 100, 102 and 104 in conjunction with the zero lapped annular flanges 126 and 128 of the valve 106 it will be readily understood that on movement of the valve 106 to the right that the conduit 52 will be connected to the source of hydraulic fluid under pressure through the conduit 84 while the conduit 50 is connected to the fluid exhaust conduit 86 through passages 98 and 104. Conversely movement of the valve 106 to the left due to opposite movement of the flapper valves 120 will reverse the connections so that conduit 50 will be connected to the source of hydraulic fluid under pressure by the conduit 84 while the conduit 52 will be connected to conduit 86 to return hydraulic fluid to the hydraulic fluid supply reservoir 82.

The housing 96 is sealed by the diaphragm means 136 about the flapper valves 120. The end 134 of the flapper valve 120 at the left in FIGURE 2 is further provided with an extension 138 which is resiliently biased by spring means 140 to return the armature 80 and flapper valves 120 to a neutral position. The bias exerted by spring means 140 is varied by means of the screw adjustment 142.

The electrical portion 94 of the electro-hydraulic servo valve 18 includes the armature 80 supported for axial movement within the guides 130 and 132. The armature 80 is connected to the ends 134 of the flapper valves 120 as shown to permit pivoting of the flapper valves 120 about their pivot mountings 124 to vary the orifices 118 in opposite direction on opposite movements of the armature 80.

In operation current flowing in opposite directions through the coils 76 and 78 will cause movement of the magnetic armature 80 in opposite directions of a magnitude depending upon the magnitude of the current due to the flux density caused by the flowing current.

In over-all operation of the apparatus 10 for maintaining the spark gap 24 substantially constant, it will first be assumed that a predetermined spark gap is present between the electrode 14 and workpiece 12. With the source of electric energy 34 connected across conductors 36 and 38, the bridge circuit 22 will be balanced so that the potential at the junction between the parts 66 and 68 of the resistance 62 as determined by the position of the variable position arm 64 of the potentiometer 60 will be exactly equal to the potential at the junction of the conductors 42 and 40 which will be determined by the division of voltage from the source 34 applied to the conductors 36 and 38 across the resistor 44 and the spark gap 24. Sparking however will occur across the spark gap 24 at an optimum rate and duration so that the metal of the workpiece 12 will be eroded as desired. The erosion of the workpiece 12 and of the electrode 14 will however produce a wider spark gap than desired or may perhaps produce a smaller spark gap than required due to eroded metal from the workpiece lodging between the electrode and the workpiece as the eroding operation proceeds.

Either of such conditions will unbalance the previously indicated bridge circuit so that current will flow in the balance sensing circuit 70. The current flow through the circuit 70 will be of a polarity and magnitude depending on whether the spark gap is larger or smaller than that desired and the amount of deviation of the spark gap from that desired.

In response to the current in the coils 76 and 78 in the balance sensing circuit 70 and the flux density created thereby the armature 80 of the electrohydraulic servo valve 18 will be caused to move either to the right or left as shown in FIGURE 2 by an amount proportional to the magnitude of the current in the balance sensing circuit 70. Thus the valve 106 will be caused to move to connect the conduits 50 and 52 to the conduits 84 and 86 in an appropriate manner to cause the piston 54 to either move the electrode 14 away from the workpiece 12 if the spark gap is smaller than the desired spark gap or to move the electrode toward the workpiece if the spark gap is greater than that desired.

The movement of the piston 54 as will be readily observed is entirely hydraulic and therefore does not depend on anti-backlash mechanisms in gear boxes or rack and pinion drives. Also the hydraulic drive for the cylinder and piston structure 16 is directly from the hydraulic fluid source 20 so that speed of reaction to a sensed spark gap variation from the desired spark gap is improved over prior electrode positioning apparatus.

Further there is no electrical amplifying means necessary in the invention as disclosed so that the spark gap controlling apparatus disclosed is much less complicated than previous electrical servo mechanisms. In addition, the spark gap controlling apparatus as disclosed above is particularly simple, is extremely efficient and requires little maintenance in comparison to prior known structures capable of functioning in the manner of the disclosed apparatus.

Also, while one embodiment of the invention has been disclosed other embodiments and modifications thereof are contemplated. It is the intention to include all such embodiments and modifications as are suggested by the foregoing disclosure within the scope of the invention as defined by the appended claims.

What I claim as my invention is:

Apparatus for spark erosion machining of a conductive workpiece comprising a source of unidirectional pulsed electric energy having a positive and negative terminal, a tank for supporting a workpiece immersed in a dielectric fluid, means for electrically connecting a workpiece positioned in the tank to the positive side of the source of electric energy, a hydraulic cylinder positioned over the tank, a piston reciprocally mounted within said cylinder, a piston rod connected to said piston and extending longitudinally of said cylinder and out of one end of the cylinder for movement toward and away from a workpiece positioned in the tank on reciprocation of the piston within said cylinder, an electrode secured to said piston rod for reciprocal movement therewith, a source of hydraulic actuating fluid for reciprocally moving the piston within the cylinder, an electro-hydraulic servo-valve connected between the source of hydraulic fluid and the cylinder including a pair of control coils wound in the same direction for actuating the valve to connect the source of hydraulic fluid to the cylinder on being energized to move the piston, piston rod and electrode in a predetermined direction with respect to the workpiece in accordance with the magnitude and polarity of the energizing signal in the control coils and the direction of winding of the control coils, a potentiometer having a resistance element connected directly across the source of electric energy and including a movable wiper arm, a first resistor directly connected to the negative terminal of the source of pulsed electrical energy at one end and directly connected to the electrode at the other end, and a rheostat having a resistance element in series with the wiper arm of said potentiometer and including a wiper arm connected through a second resistor in series therewith and with the control coils of the electro-hydraulic servo-valve directly between the electrode and the first resistor.

References Cited by the Examiner

UNITED STATES PATENTS

| | | | |
|---|---|---|---|
| 2,762,946 | 9/56 | Manchester | 314—61 |
| 2,841,686 | 7/58 | Williams | 219—69 |
| 2,912,008 | 11/59 | Blackburn | 137—623 |
| 2,984,761 | 5/61 | Webb | 314—61 |
| 2,989,616 | 6/61 | Mironoff | 219—69 |
| 3,026,892 | 3/62 | Tsien | 137—82 |
| 3,060,969 | 10/62 | Aslan | 137—623 |

RICHARD M. WOOD, *Primary Examiner.*